United States Patent [19]

Zsolnay

[11] 4,373,092

[45] Feb. 8, 1983

[54] METHOD OF PROCESS CONTROL FOR THERMOSETTING RESINS HAVING ADDITION-TYPE REACTIONS

[75] Inventor: Andrew Zsolnay, Manhattan Beach, Calif.

[73] Assignee: Lockheed Corporation, Burbank, Calif.

[21] Appl. No.: 220,370

[22] Filed: Dec. 29, 1980

[51] Int. Cl.³ .............................................. C08F 6/00
[52] U.S. Cl. ................................. 528/481; 264/40.3; 264/40.5; 528/503
[58] Field of Search ............... 260/95 A, 95 C, 96 R, 260/42.29, 42.32; 528/481, 503; 264/40.1, 40.3, 40.5

[56] References Cited

U.S. PATENT DOCUMENTS

| | | | |
|---|---|---|---|
| 3,770,662 | 11/1973 | Hennessy | 260/96 R |
| 3,883,472 | 5/1975 | Greene | 260/42.29 |
| 3,916,023 | 10/1975 | Porter | 260/95 A |
| 4,089,917 | 5/1978 | Takiura | 264/40.3 |
| 4,271,106 | 6/1981 | Groleau | 264/40.5 |

OTHER PUBLICATIONS

In re Diehr and Lutton, 203USPQ44, published Oct. 1, 1979.
Michael J. Yokata, "In-Process Controlled Curing of Resin Matrix Composites", 22nd National SAMPE Symposium and Exhibition, vol. 22, 1977.

*Primary Examiner*—Paul R. Michl
*Attorney, Agent, or Firm*—Frederic P. Smith

[57] ABSTRACT

A sample of polymeric composite material is cured using conventional curing methods. The optimum time during the cure cycle for applying pressure to the sample is determined by standard resin advancement measuring techniques. A dielectrometer monitoring device (15) is then attached to another material of the same type which is cured under the same conditions to develop an analog signal denoting variations in dissipation of the material. The dissipation curve characteristically has a first and second maximum value, with the latter occurring in the general vicinity of the optimum time for applying pressure for a particular frequency. Thus by changing the frequency, the dissipation is shifted along the time axis so that the second maximum coincides with the optimum time for applying pressure. The generation of a readily recognizable and repeatable feature on the analog wave form, a minimum or maximum, is a prerequisite to triggering process control functions. Thereafter, a voltage at that particular frequency is applied to other similar materials during their cure cycles to obtain a dissipation curve which has a second maximum value coinciding with the optimum pressure application point. The dielectric monitoring unit (15) is connected to a microprocessor (20) which determines the time at which such maximum value is reached, in response to which a command signal is sent to a pressure control system (24) connected to the microprocessor (20) for applying pressure to the material, all in an automatic, closed-loop system.

7 Claims, 3 Drawing Figures

METHOD OF PROCESS CONTROL FOR THERMOSETTING RESINS HAVING ADDITION-TYPE REACTIONS

TECHNICAL FIELD

The invention relates to the field of process control and, in particular, to the process control of thermosetting resins having addition-type reactions.

BACKGROUND ART

As disclosed in copending U.S. patent application Ser. No. 220,369 to applicant and others and assigned to the same assignee as the present invention, the curing cycle of thermosetting resin composite systems generally involves the application of heat to initiate and sustain polymerization while volatiles are driven off, followed by the application of pressure to the composite when crosslinking takes place, i.e., at the onset of gelation but before hardening of the composite. The pressure is applied to the composite to compact same, thereby squeezing out excess resin and eliminating voids in the composite.

The exact time of applying pressure has been found to be critical if optimum mechanical properties in the cured composite are to be achieved. If the pressure is applied too early or too late in the cure cycle, the cured composite has an unacceptable number of voids therein and an unacceptably high resin/fiber ratio.

Dielectrometers have heretofore been used to monitor the capacitance (corresponding to chemical changes occuring) and dissipation (viscosity) of a composite during its cure cycle, with such data being used to develop a characteristic wave form for a given type of composite material. The information developed was then used to determine the best time for applying pressure to the composite.

In the case of polymeric materials having addition-type reactions, the capacitance curve is relatively featureless and incapable of defining the optimum time for applying pressure. The dissipation curve does have two fairly definitive maximum levels established on the curve with the second maximum occuring in the general vicinity of a so-called "pressure application window" (which is defined on one side by the onset of gelation and on the other side by the hardening point of the polymer). This second maximum has been used as a basis for triggering the pressure application with some success when operating in the "manual" mode. Some operators have attempted to initiate pressure application at points on the upward slope of the curve just prior to reaching the maximum in an attempt to avail themselves of the entire width of the pressure window, but this has only been met with moderate success.

Accordingly there is a need for a simple, accurate and efficient method for developing a control signal characteristic which is indicative of the optimum time for applying pressure to an addition-type reaction composite in order to obtain optimum mechanical characteristics in a completely cured composite. Such a method should preferably be automatic, have a flexibility capable of handling different types of addition-type reaction resin systems, complete the curing process in a minimum amount of time, and render a cured composite which is substantially free of voids and which has minimal resin content lying in an acceptable range. Further, it would be advantageous if a single computer program could be utilized for the curing of a number of different types of polymers.

DISCLOSURE OF INVENTION

Although it is possible as noted above to use a dielectrometer monitoring device on addition-type reaction polymers to generate a dissipation curve with respect to time in such a manner that a second maximum is obtained in the general vicinity of the pressure application window, it would be preferable if this second maximum occured precisely at the onset of gelation (the beginning of the pressure window). Applicant has achieved this in the present invention by shifting the second maximum along the time axis to the optimum point for applying pressure by varying the frequency of the signal by which the dissipation curve is generated.

Initially, a sample of a given addition-type reaction polymer material is cured using conventional curing methods. Standard resin advancement measuring techniques are used to determine the optimum time for applying pressure to the material. Subsequently, another like material is cured by the same method while a dielectrometer monitors changes in dissipation. During such cure cycle, an alternating current voltage is applied to the material with the frequency thereof being varied so as to determine the particular frequency where the second maximum occurs precisely at the optimum time noted with the previous sample. In effect, the dissipation peak is being shifted along the time axis so as to coincide with such optimum time.

It is now possible to subject other materials of the same type to an alternating current voltage at that particular frequency to obtain the second maximum and, upon reaching same, to generate a control signal for applying pressure to the composite.

BEST MODE FOR CARRYING OUT THE INVENTION

Figure 1:
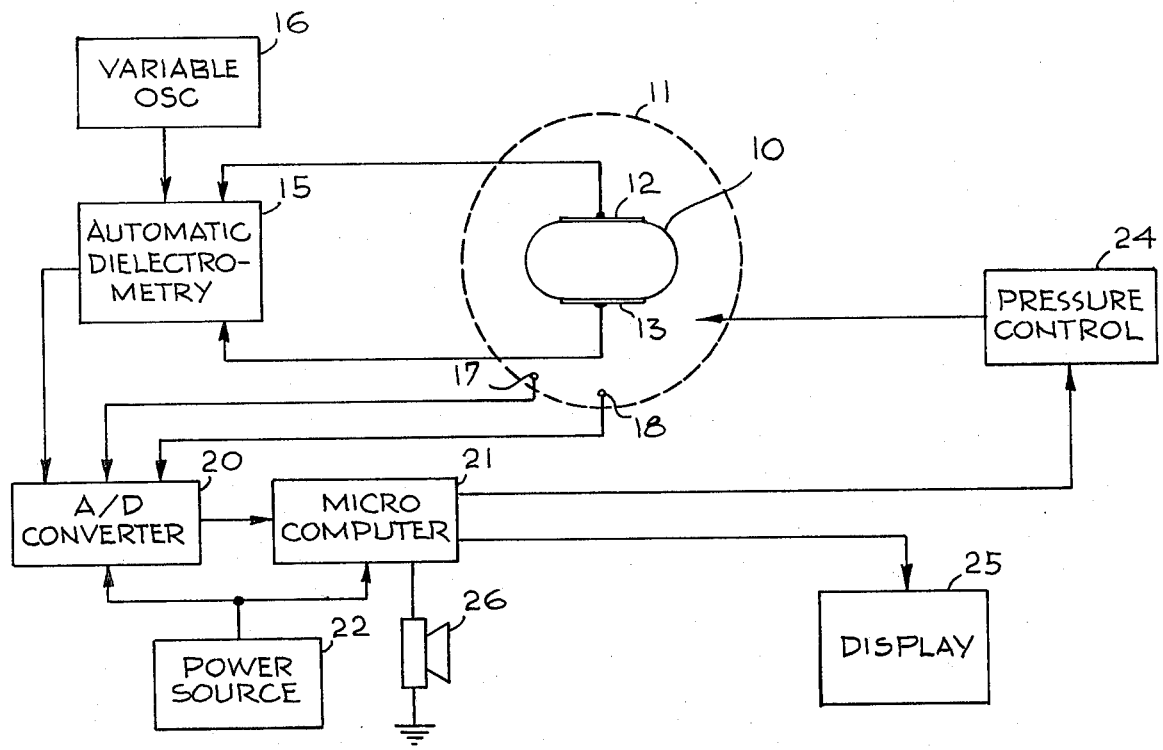
FIG. 1 is a schematic view and block diagram of an apparatus for performing the process of the present invention.

Referring now to the drawings and in particular to FIG. 1, there is illustrated schematically an apparatus for performing the process of the present invention. A polymeric material of the type experiencing an addition-type reaction during curing is shown at 10 contained in processing equipment 11. A pair of electrodes 12 and 13 are applied across the material 10 and are connected as shown to an automatic dielectrometry instrument 15, known as an Audrey Dielectrometer and available from Tetrahedron Associates. A variable oscillator 16 is coupled to the instrument 15. The processing equipment 11 is also provided with a temperature sensor 17 and a pressure sensor 18 which may be a thermocouple and a pressure responsive device, respectively.

The output of the instrument 15 is impressed on an analog/digital converter 20 as is the output of the two sensors 17 and 19. The output of the converter 20 feeds a microcomputer 21, which, along with converter 20, is energized by power source 22. The computer 21 generates a control signal which in turn controls pressure control 24 for applying pressure by, for example, a platten press to the material 10. The computer 21 may also control a visual display 25 and an acoustic indicator 26 to provide on-line information about the process.

In accordance with the present invention, heat is applied to a sample of an addition-type reaction polymeric material to effect a cure. This material is initially physically examined at various times during the cure cycle by conventional techniques, noting viscosity changes, solubility etc., to determine the time into the cycle when cross-linking of the polymer starts, i.e., the initiation of gelation. This point in time has been determined to be the optimum time for applying pressure to the material.

Thereafter, a second sample of the same type of polymeric material is monitored by the system shown in FIG. 1, with an alternating current voltage being applied thereto by oscillator 16 at different frequencies f. In this manner, the particular frequency where the dissipation curve realizes its second maximum value conicident with the optimum time can readily be determined.

Figure 2:
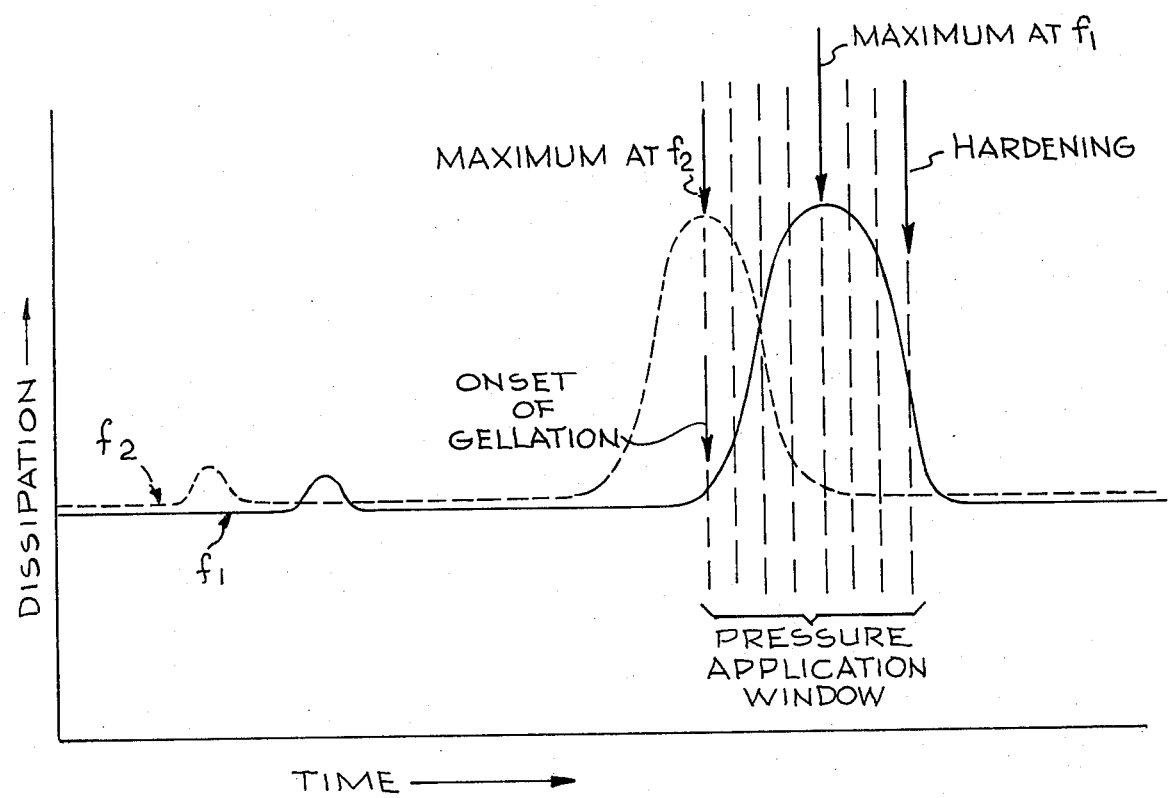
FIG. 2 is a chart showing the dissipation of an addition-type reaction polymeric material as a function of time, along with a representation of a curve shifted along the time axis.

As shown in FIG. 2, the second maximum value at frequency $f_1$ occurs within the pressure application window. By the above method, the variation of the frequency results in a shifting of the curve along the time axis, with a particular frequency $f_2$ (shown by the dotted line) being the frequency at which the second maximum occurs at the optimum time.

Having determined the optimum time and particular frequency $f_2$, other polymeric materials of the same type can be cured with the system of FIG. 1. Such materials include epoxies and addition-type polyimides. Pressure is applied by pressure control unit 24 when the dissipation reaches a maximum value, in response to a control signal generated by microcomputer 21 using the computer program described below.

The program basically is a series of sample, hold, compare, wait, resample, compare and decision modules. The program establishes an initial zero slope value and proceeds to make an initial sample. Having sampled the dielectric reading of the resin under cure, the program compares and determines the slope trend.

The program in FIGS. 3a and 3b, for an addition-type polymer reaction, tracks the slope trend until an initial minimum occurs, at which point an internal switch is set to reverse the slope detection, after which the controlled monitoring process resumes. Upon detection of a first maximum value, the slope trend again reverses field toward a second minimum value. Upon detection of a second minimum value, the slope trend again reverses field toward a second maximum value (inception of pressure window). At that point, a decision switch acts to apply power to external pressure, vacuum and temperature controls, as desired.

Figure 3:
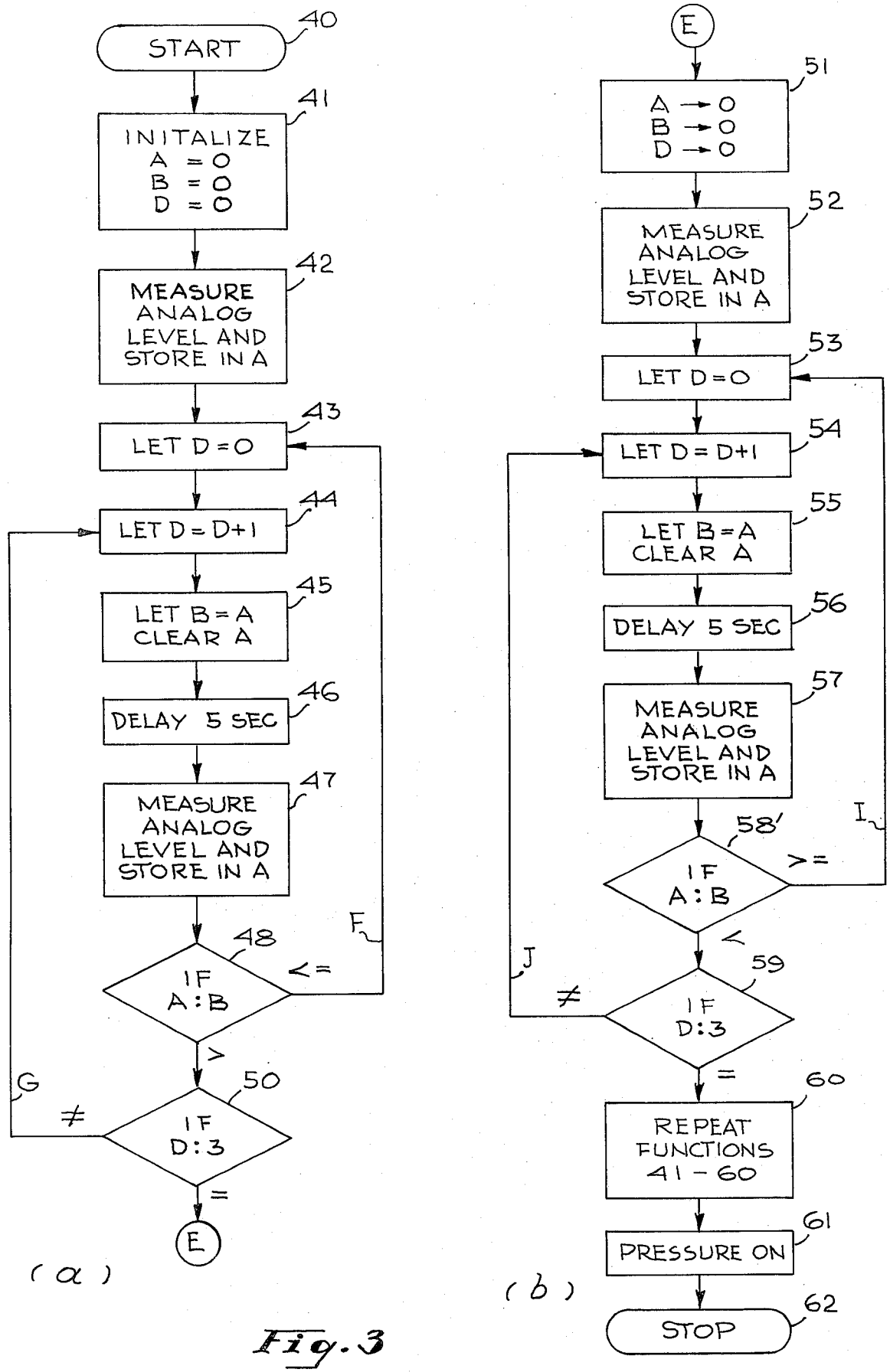
FIGS. 3a and 3b are flow charts of a computer program for developing a control signal to apply pressure to an addition-type polymer material.

FIG. 3 is a functional flow chart of a preferred computer program for implementing the above objects. As shown in FIG. 3a, the program starts as shown by box 40. The system is initiated as shown in box 41 by setting A,B, and D to zero to start the process. Both A and B are temporary storage devices, while D is a counter which counts the number of samplings. The analog level of the dissipation is measured as indicated at box 42 and the result is stored in A. In box 43 the counter D is again set to zero. In the next box 44, 1 is added to the counter D. Then, in box 45, B is made equal to A and A is cleared. In accordance with box 46, a time delay of five seconds is initiated. Thereupon, in box 47, the analog level is measured again and stored in A.

As shown in FIG. 3a and box 48, if A is less than or equal to B, the information goes back to box 43, as shown by connection F, where the counter is set to zero again and the process repeats since an increasing analog signal is being sought to establish an uptrend.

If A is greater than B, that is, if the analog signal is increasing, the process proceeds to box 50. Here another decision is made, namely, whether D is equal to 3 or unequal to 3. If it is unequal, the result goes back to box 44, as shown by connection G, where 1 is added to the counter D and the process repeats. The process is repeated to insure that the increase is in fact true and not due to a short term variation causing a false signal.

If D equals 3, an uptrend of the curve is established, and the process continues to box 51 (FIG. 3b) where A,B and D are set to zero again. The next step taken, as shown by box 52, is to measure the analog level again and store it in A. In accordance with box 53, the counter D is set to zero, while in box 54, 1 is added to the counter D. As shown in box 55, the contents of memory A are then transferred to memory B while memory A is cleared. A delay of five seconds is again introduced by box 56 whereupon the analog level is measured again and stored in memory A (box 57).

In box 58, a comparison is made between A and B. If A is larger than or equal to B, the information goes back to box 53 (connection I) where the counter is set to zero, and the process is repeated. If A is less than B, the process proceeds to box 59, where a decision is made whether D is equal to or unequal to 3. If D is unequal to 3, the process proceeds back to box 54 via connection J, 1 is added to the counter D and the process repeats. As before, the process is repeated to insure the decrease is in fact true and not due to a short term variation causing a false signal.

Finally, if D does equal 3, a downtrend is established and the process repeats itself, as provided by box 60, because two maximum dissipation levels are being sought. When D in box 59 equals 3 a second time, a control signal is developed as shown by box 61 to apply the pressure (and activate other controls, if desired). The computer then stops, as shown at box 62.

It will now be seen that an uptrend is established whenever the computer reaches box 51 and a downtrend whenever it reaches box 60 with appropriate signals being given when such points are reached. Hence, the program reads the dissipation value in a manner which insures that true upslopes and downslopes of the dissipation curve are established, and finally establishes the initiation of a reversal to a downslope, thereby defining the maximum dissipation value which is the optimum time for applying pressure to the composite. It is evident that the computer performs a slope-tracking operation. Thus, a program is provided which is inherently designed to ignore short term burst noise by the repeat operation controlled by boxes 50 and 59.

There has thus been disclosed a method for generating a definite electrical signal which coincides with the optimum time for applying pressure to an addition-type polymeric material during its cure cycle.

It is to be understood that other and equivalent methods and programs can be utilized which are based upon and employ the inventive concepts set forth herein. Applicant intends only to limit the scope of his invention as such as defined in the appended claims.

INDUSTRIAL APPLICABILITY

The method is useful in the curing of thermosetting resins having addition-type reactions.

I claim:

1. The method of curing a thermosetting polymeric material which undergoes an addition-type reaction during curing, comprising the steps of:
   (a) determining from a first sample of said material the optimum time for applying pressure to said material;
   (b) determining that frequency of an alternating current signal applied to a second sample of said material which causes a characteristic value of dissipation to occur at said optimum time;
   (c) applying heat to a third sample of said material to initiate curing thereof;
   (d) applying an alternating current signal having said determined frequency to said third sample to generate a dissipation curve, as said curing progresses, having said characteristic value at said optimum time;
   (e) generating a pressure application control signal when said characteristic value is reached; and
   (f) applying pressure to said third sample of said material in response to said control signal.

2. The method of claim 1 wherein said step for determining the optimum time includes:
   (a) observing the curing of said first sample of said material; and
   (b) periodically testing said first sample of said material to determine the onset of gelation thereof.

3. The method of claim 1 wherein said step for determining said frequency includes:
   (a) applying an alternating current voltage to said second sample of said material;
   (b) applying heat to said second sample of said material to initiate the curing thereof;
   (c) measuring the dissipation of said second sample of said material during the curing thereof to determine said characteristic value thereof; and
   (d) changing the frequency of said alternating current voltage until said characteristic value occurs at said optimum time.

4. The method of claim 1 wherein said characteristic value is a maximum value.

5. The method of curing a thermosetting polymeric material which undergoes an addition-type reaction during curing, comprising the steps of:
   (a) determining from a first sample of said material the optimum time for applying pressure to said material;
   (b) applying an alternating current signal to a second sample of said material to generate, as said second sample is being cured, a dissipation curve of said material having a characteristic value;
   (c) applying heat to said second sample to initiate the curing thereof;
   (d) varying the frequency of said alternating current signal to determine that frequency of said alternating current signal which causes said dissipation curve to shift an amount along the time axis such that said characteristic value occurs at said optimum time;
   (e) applying heat to a third sample of said material to initiate curing thereof;
   (f) applying an alternating current signal having said determined frequency to said third sample to generate said dissipation curve, as said curing progresses, having said characteristic value at said optimum time;
   (g) generating a pressure application control signal when said characteristic value is reached; and
   (h) applying pressure to said third sample of said material in response to said control signal.

6. The method of claim 5 wherein said step for determining the optimum time includes:
   (a) observing the curing of said first sample of said material; and
   (b) periodically testing said first sample of said material to determine the onset of gelation thereof.

7. The method of claim 5 wherein said characteristic value is a maximum value.

* * * * *